US012684527B2

(12) United States Patent
Adjei et al.

(10) Patent No.: US 12,684,527 B2
(45) Date of Patent: Jul. 14, 2026

(54) SYSTEMS AND METHODS FOR PROVIDING A GEO-TARGETED INVITATION

(71) Applicant: Capital One Services, LLC, McLean, VA (US)

(72) Inventors: John Adjei, Gainesville, VA (US); Kendra Florio, Sterling, VA (US); Joshua Edwards, Philadelphia, PA (US); Kevin Osborn, Newton Highlands, MA (US); Jordan Ridenour, Chicago, IL (US)

(73) Assignee: Capital One Services, LLC, McLean, VA (US)

( * ) Notice: Subject to any disclaimer, the term of this patent is extended or adjusted under 35 U.S.C. 154(b) by 419 days.

(21) Appl. No.: 18/524,642

(22) Filed: Nov. 30, 2023

(65) Prior Publication Data

US 2025/0184955 A1    Jun. 5, 2025

(51) Int. Cl.
*H04W 64/00*        (2009.01)
*G01S 5/02*         (2010.01)

(52) U.S. Cl.
CPC ....... *H04W 64/003* (2013.01); *G01S 5/02522* (2020.05)

(58) Field of Classification Search
CPC .......................... H04W 64/003; G01S 5/02522
See application file for complete search history.

(56) References Cited

U.S. PATENT DOCUMENTS

| | | | |
|---|---|---|---|
| 9,521,524 B2 | 12/2016 | Busch | |
| 10,074,107 B2 | 9/2018 | Grucci et al. | |
| 11,120,414 B1 | 9/2021 | Varma et al. | |
| 2024/0372636 A1* | 11/2024 | Ermolov | H04W 64/003 |

* cited by examiner

*Primary Examiner* — Curtis B Odom
(74) *Attorney, Agent, or Firm* — Bookoff McAndrews, PLLC

(57) ABSTRACT

A method of transmitting user guidance may include receiving captured electronic device location data. The method may include providing the electronic device location data and a plurality of account data of the unique user to a machine-learning model. The machine-learning model may be trained to identify location patterns within the electronic device location data and the plurality of account data of the unique user and output a user current location and a user base location. The method may further include determining a user target location using the user current location and the user base location. The method may further include comparing the user target location to entity target criteria to determine if the user target location satisfies the entity target criteria. The method may further include transmitting the user guidance to the electronic device associated with the unique user based on the user target location satisfying the entity target criteria.

20 Claims, 6 Drawing Sheets

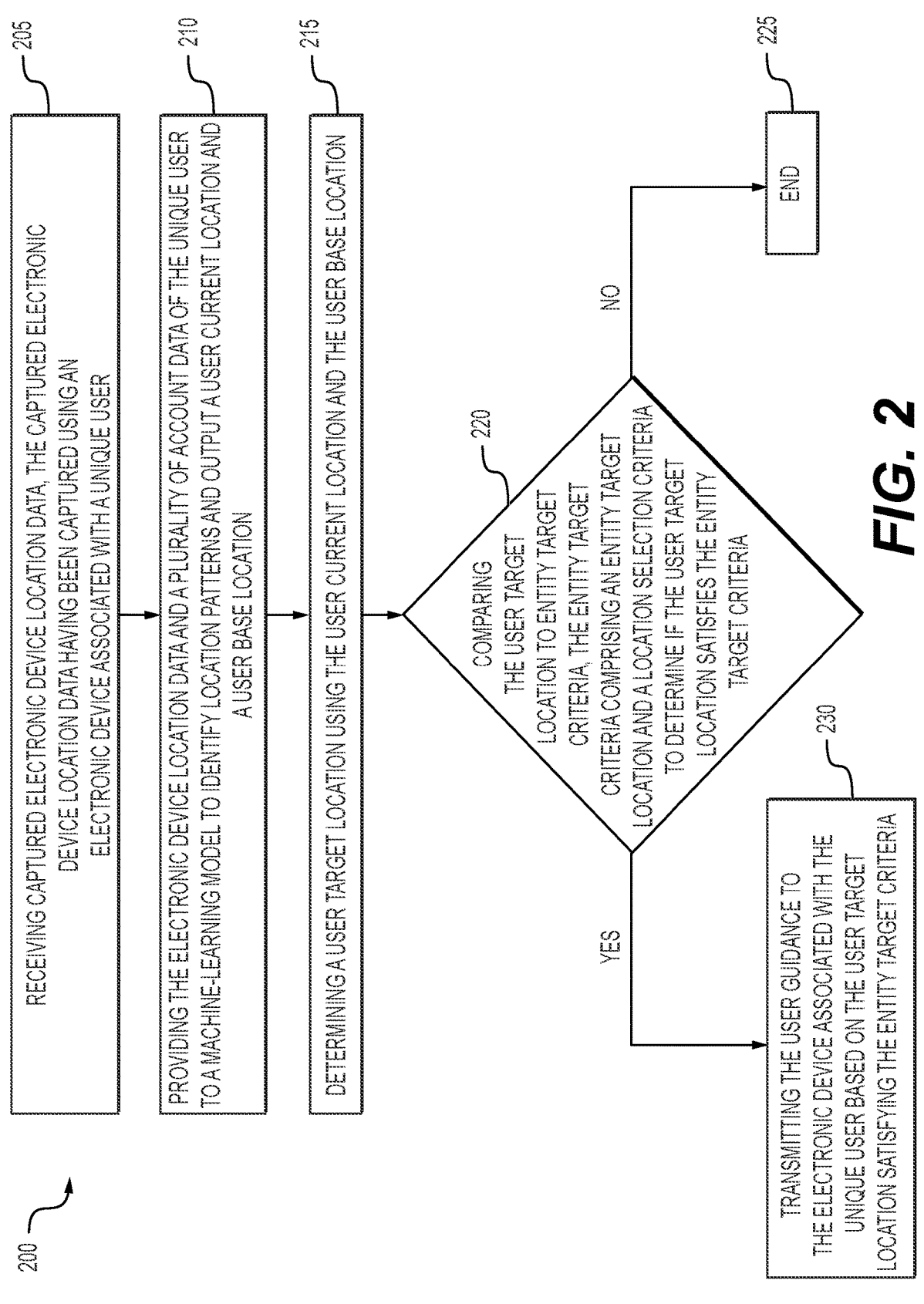

200

205
RECEIVING CAPTURED ELECTRONIC DEVICE LOCATION DATA, THE CAPTURED ELECTRONIC DEVICE LOCATION DATA HAVING BEEN CAPTURED USING AN ELECTRONIC DEVICE ASSOCIATED WITH A UNIQUE USER

210
PROVIDING THE ELECTRONIC DEVICE LOCATION DATA AND A PLURALITY OF ACCOUNT DATA OF THE UNIQUE USER TO A MACHINE-LEARNING MODEL TO IDENTIFY LOCATION PATTERNS AND OUTPUT A USER CURRENT LOCATION AND A USER BASE LOCATION

215
DETERMINING A USER TARGET LOCATION USING THE USER CURRENT LOCATION AND THE USER BASE LOCATION

220
COMPARING THE USER TARGET LOCATION TO ENTITY TARGET CRITERIA, THE ENTITY TARGET CRITERIA COMPRISING AN ENTITY TARGET LOCATION AND A LOCATION SELECTION CRITERIA TO DETERMINE IF THE USER TARGET LOCATION SATISFIES THE ENTITY TARGET CRITERIA

NO

225
END

YES

230
TRANSMITTING THE USER GUIDANCE TO THE ELECTRONIC DEVICE ASSOCIATED WITH THE UNIQUE USER BASED ON THE USER TARGET LOCATION SATISFYING THE ENTITY TARGET CRITERIA

DETERMINING A TARGET THRESHOLD LEVEL OF THE USER TARGET LOCATION BASED ON AN ALIGNMENT BETWEEN THE ELECTRONIC DEVICE LOCATION DATA AND THE PLURALITY OF ACCOUNT DATA

310

COMPARING THE TARGET THRESHOLD LEVEL OF THE USER TARGET LOCATION TO THE TARGET THRESHOLD RANGE TO DETERMINE IF THE TARGET THRESHOLD LEVEL IS WITHIN THE TARGET THRESHOLD RANGE

300

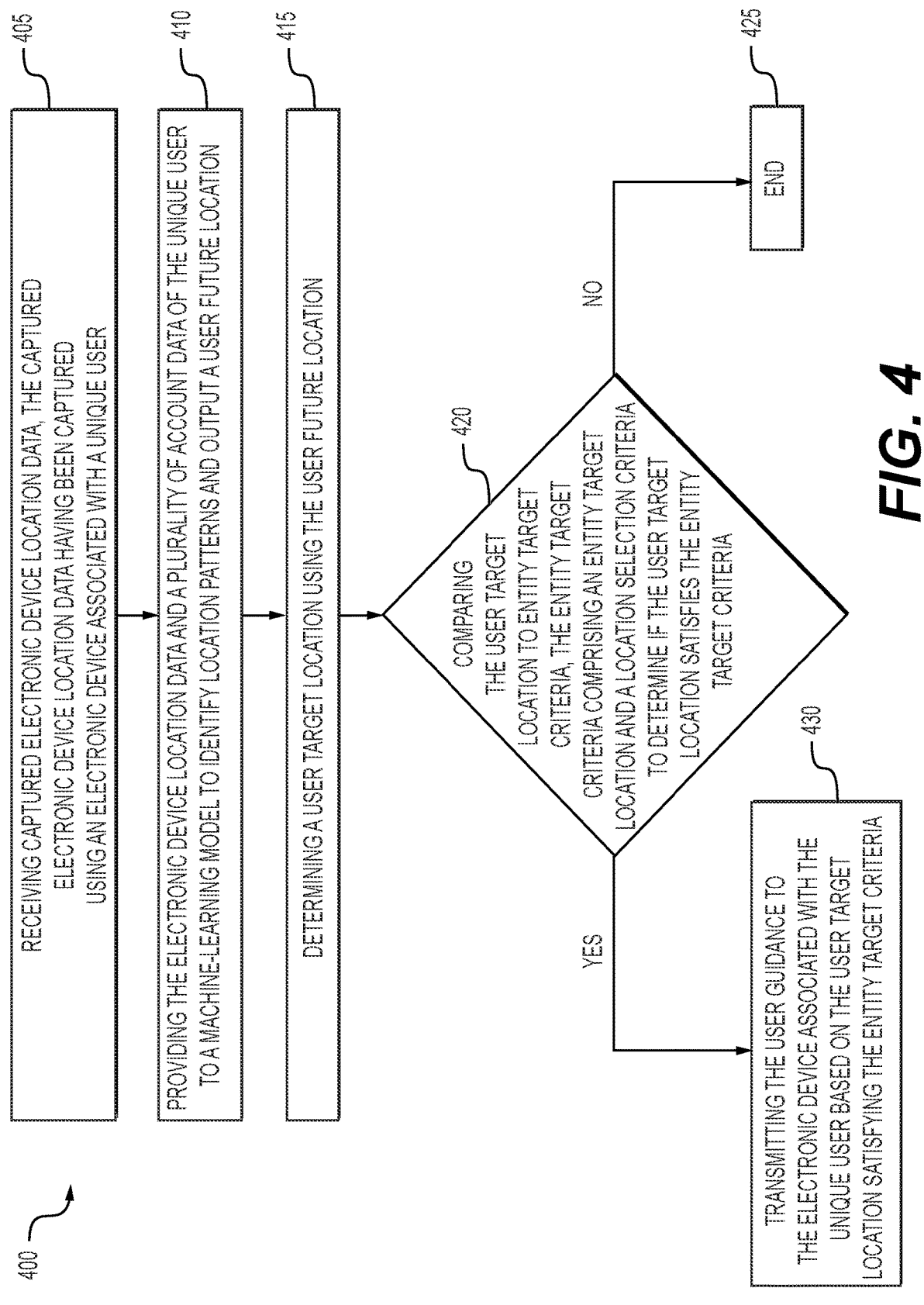

400

405
RECEIVING CAPTURED ELECTRONIC DEVICE LOCATION DATA, THE CAPTURED ELECTRONIC DEVICE LOCATION DATA HAVING BEEN CAPTURED USING AN ELECTRONIC DEVICE ASSOCIATED WITH A UNIQUE USER

410
PROVIDING THE ELECTRONIC DEVICE LOCATION DATA AND A PLURALITY OF ACCOUNT DATA OF THE UNIQUE USER TO A MACHINE-LEARNING MODEL TO IDENTIFY LOCATION PATTERNS AND OUTPUT A USER FUTURE LOCATION

415
DETERMINING A USER TARGET LOCATION USING THE USER FUTURE LOCATION

420
COMPARING THE USER TARGET LOCATION TO ENTITY TARGET CRITERIA, THE ENTITY TARGET CRITERIA COMPRISING AN ENTITY TARGET LOCATION AND A LOCATION SELECTION CRITERIA TO DETERMINE IF THE USER TARGET LOCATION SATISFIES THE ENTITY TARGET CRITERIA

NO

425
END

YES

430
TRANSMITTING THE USER GUIDANCE TO THE ELECTRONIC DEVICE ASSOCIATED WITH THE UNIQUE USER BASED ON THE USER TARGET LOCATION SATISFYING THE ENTITY TARGET CRITERIA

FIG. 4

SYSTEMS AND METHODS FOR PROVIDING A GEO-TARGETED INVITATION

TECHNICAL FIELD

Various embodiments of this disclosure relate generally to machine-learning-based techniques for determining associations between location data and account data and, more particularly, to systems and methods for transmitting user guidance.

BACKGROUND

In a variety of circumstances, the relevancy of particular guidance for a unique individual (e.g., a marketing offer, coupon, recommendation, invitation, or the like) may benefit from using geo-targeting to pinpoint the location of the individual (e.g., consumer). In such cases where the guidance may be location-specific, determining a location of the individual at any given time may yield more relevant (e.g., timely, useful, informative, etc.) guidance for each individual. Additionally, an individual's interaction history, as related to the individual's location, may also yield more relevant guidance for the consumer. The guidance may therefore be accurately targeted to geo-local individuals (e.g., local users) to create repeat engagement, and may also accurately target the location of individuals while traveling, to identify the most relevant offers based on where the individual is located at any given time. Currently, techniques such as capturing an IP address of a user's device may be used, but this data may often be inaccurate, or may lead to less relevant results.

Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for transmitting user guidance.

In one aspect, an exemplary embodiment of a method for transmitting user guidance may include receiving captured electronic device location data. The captured electronic device location data may have been captured using an electronic device associated with a unique user. The method may further include providing the electronic device location data and a plurality of account data of the unique user to a machine-learning model. The machine-learning model may be trained, using one or more gathered and/or simulated sets of location data and one or more gathered and/or simulated sets of account data, to identify location patterns within the electronic device location data and the plurality of account data of the unique user and output a user current location and a user base location. The method may further include determining a user target location using the user current location and the user base location. The method may further include comparing the user target location to entity target criteria to determine if the user target location satisfies the entity target criteria. The entity target criteria may include an entity target location and a location selection criteria. The method may further include transmitting the user guidance to the electronic device associated with the unique user based on the user target location satisfying the entity target criteria.

In another aspect, an exemplary embodiment of a method for transmitting user guidance may include receiving captured electronic device location data. The captured electronic device location data may have been captured using an electronic device associated with a unique user. The method may further include providing the electronic device location data and a plurality of account data of the unique user to a machine-learning model. The machine-learning model may be trained, using one or more gathered and/or simulated sets of location data and one or more gathered and/or simulated sets of account data, to identify location patterns within the electronic device location data and the plurality of account data of the unique user and output a user future location. The method may further include determining a user target location using the user future location. The method may further include comparing the user target location to entity target criteria to determine if the user target location satisfies the entity target criteria. The entity target criteria may include an entity target location and a location selection criteria. The method may further include transmitting the user guidance to the electronic device associated with the unique user based on the user target location satisfying the entity target criteria.

In a further aspect, an exemplary embodiment of a system for transmitting user guidance may include a memory storing instructions and a machine-learning model trained to find patterns between one or more gathered and/or simulated sets of location data and one or more gathered and/or simulated sets of account data to identify location patterns and output a user current location and a user base location. The system may further include one or more processors operatively connected to the memory and configured to execute the instructions to perform operations. The operations may include receiving captured electronic device location data. The operations may further include providing the electronic device location data and a plurality of account data of the unique user to the machine-learning model. The operations may further include outputting, by the machine-learning model, the user current location and the user base location. The operations may further include determining a user target location using the user current location and the user base location. The operations may further include comparing the user target location to entity target criteria to determine if the user target location satisfies the entity target criteria. The entity target criteria may include an entity target location and a location selection criteria. The operations may further include transmitting the user guidance to the electronic device associated with the unique user based on the user target location satisfying the entity target criteria.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2 depicts a flowchart of an exemplary method of transmitting user guidance, according to one or more embodiments.

FIG. 4 depicts a flowchart of an exemplary method of transmitting user guidance using a user future location, according to one or more embodiments.

DETAILED DESCRIPTION OF EMBODIMENTS

Figure 1:
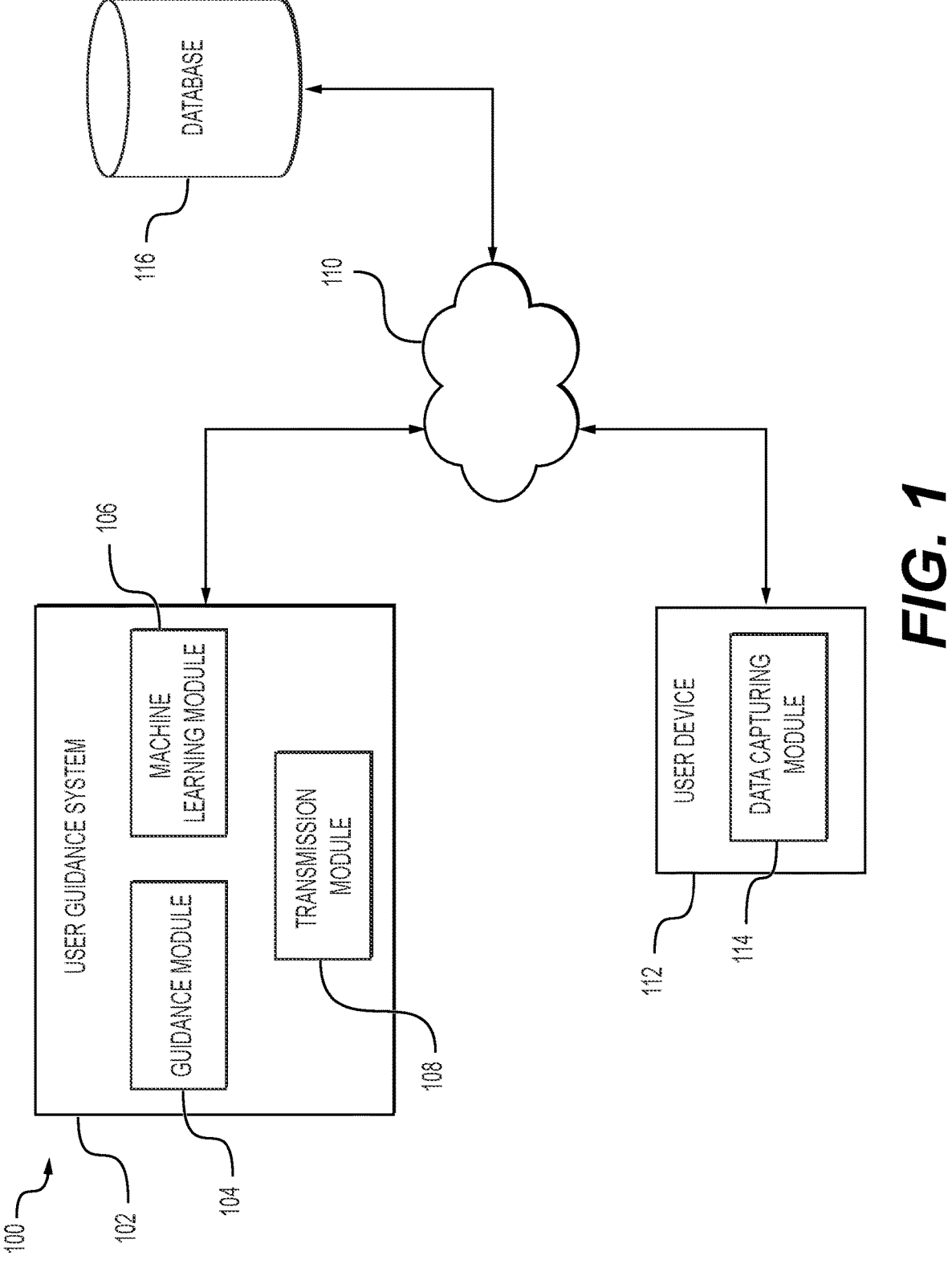
FIG. 1 depicts an exemplary environment for transmitting user guidance, according to one or more embodiments.

According to certain aspects of the disclosure, methods and systems are disclosed for transmitting geo-targeted user guidance. Determining user guidance that would be helpful or applicable to the user and/or an efficient use of an entity's (e.g. a merchant's) resources via conventional means may be computationally nontrivial and/or impractical. Therefore, by targeting specific geographically located consumers, at either a base location (e.g., a "home" location) or a current user location (e.g., while travelling outside of the area of the base location), entities (e.g., merchants) may ensure that the guidance, invitations, or offers they are pushing to users (e.g., consumers) may have the highest chance of success (e.g., leading to a sale, receiving a return on the marketing investment, and the like).

A machine-learning model may be utilized to find associations between location data of a unique user and account data (e.g., interaction history) of a unique user, to identify (e.g., determine and/or predict) location patterns. Both a user's location and account data, such as interaction history, may be used to determine whether a unique user is within a targeted location(s). A variety of sources of information may be used to determine a base location of a user, as well as a current location of the user (e.g., as related to the base location). Entities may therefore target their offers more efficiently, in ways that may conserve computational and other resources. In a particular use case, a user that is traveling, for example, may have a "base" location within a certain geographic footprint. After determining the user's location, the entity may compare a set of criteria for their offering with the user's location, amongst other factors that may influence an entity's criteria of which consumers may be allowed to interact with the offering. For example, certain offerings may be withheld from users that do not match the geographic requirements for that offering based upon the entity's criteria.

In examples, location data may be captured or determined by mapping multiple data sources together to determine the location of a user (e.g., recent interaction history, geographic location of devices, visual identification of location through pictures and/or augmented reality (AR), and the like). In using AR, computer vision may be utilized to detect landmarks that may be indicative of the user's current location, frequency of seeing those landmarks (and thus being proximate to the same), and the like.

As will be discussed in more detail below, in various embodiments, systems and methods are described for using machine-learning to determine a user base location and user current location. By training a machine-learning model (e.g., via supervised or semi-supervised learning), to learn associations between location data and account data, the trained machine-learning model may be usable to determine a user base location and a user current location. The machine-learning model may output the user base location and the user current location.

Further, as will be discussed in more detail below, the present systems and methods are described for using machine-learning to identify location patterns within user-specific data input into a machine-learning model, for example, account data and captured electronic device location of the unique user. The output of the machine-learning model may be used to determine user guidance, or whether or not to transmit user guidance to a computing device, for the unique user. In this way, given a large set of possible guidance that may be transmitted, the cost of resources associated with transmitting the guidance, and given previously unrelated sets of data associated with account data and location data of the unique user, machine-learning may be used to maximize finite resources of an entity and to efficiently provide relevant user guidance to a unique user.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially," "approximately," and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Terms like "provider," "merchant," "vendor," or the like generally encompass an entity or person involved in providing, selling, and/or renting items to persons such as a seller, dealer, renter, merchant, vendor, or the like, as well as an agent or intermediary of such an entity or person. An "item" generally encompasses a good, service, or the like having ownership or other rights that may be transferred. As used herein, terms like "user" or "customer" generally encompasses any person or entity that may desire information, resolution of an issue, purchase of a product, or engage in any other type of interaction with a provider. The term "browser extension" may be used interchangeably with other terms like "program," "electronic application," or the like, and generally encompasses software that is configured to interact with, modify, override, supplement, or operate in conjunction with other software. As used herein, terms such as "guidance" or the like generally encompass one or more recommendations.

As used herein, a "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine-learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

In an exemplary use case, a machine-learning algorithm may be configured to train a machine-learning model by modifying one or more of a weight, a layer, a node, and/or a synapse of the machine-learning model such that the machine-learning model may be configured to identify location patterns within electronic device location data and a plurality of account data of a unique user and output a user current location and a user base location.

In another exemplary use case, it may be determined where a user resides (e.g., a user base location) using user device location data and transaction history account data. A current location of the user (e.g., a user current location) may also be determined using the user device location data and the transaction history account data. Where the user resides and the current location of the user may then be used to geo-target marketing offers.

In another exemplary use case, merchants may direct offers to consumers that are travelling, consumers that have a "base location" within a certain geographic footprint, or the like. Therefore, a consumer's location may be determined and then an offer may be validated based on the consumer's location. Further, offers may include a set of criteria set by the merchant that may be compared to the consumer's location information.

In another exemplary use case, the user base location and the user current location may be used to determine a user target location. The user target location may be compared to the set of criteria set by the merchant to see if the offer should be presented to the user. Additionally, the merchant may select whether they desire to target a user within their base location and/or within their current (e.g., travelling) location. This selection may further determine if the offer should be presented to the user.

In another exemplary use case, multiple data sources may be used to determine the location of a user (e.g., recent transaction history, geographic location of devices, visual identification of location through pictures and/or augmented reality (AR), and the like). By using AR, computer vision may be utilized to detect landmarks that may be indicative of the user's current location, frequency of seeing those landmarks (and thus being proximate to the same), and the like.

In another exemplary use case, the offer (e.g., guidance) may be transmitted to a user device and displayed on the user device if it is determined that the offer should be presented to the user. Each unique user's base location and current location may be compared with a merchant's set of criteria and location selection to determine if the offer should be presented to each unique user. In this way, the transmission of user guidance may be unique to each individual user and to each individual circumstance of the user at any given time or place.

While the examples above involve transmitting user guidance, it should be understood that techniques according to this disclosure may be adapted to any suitable type of providing geo-targeted user guidance. It should also be understood that the examples herein are illustrative only. The techniques and technologies of this disclosure may be adapted to any suitable activity.

As used herein, and as discussed in greater detail below, "transmitting user guidance" may refer to transmitting, generating, and/or outputting geo-targeted guidance, offers, marketing, or the like. For example, a machine-learning model may be trained, using one or more gathered and/or simulated sets of location data and one or more gathered and/or simulated sets of account data, to identify location patterns within the electronic device location data and the plurality of account data of the unique user and output a user current location and a user base location.

Presented below are also various aspects of machine-learning techniques that may be adapted to user guidance. As will be discussed in more detail below, machine-learning techniques adapted to user guidance, may include one or more aspects according to this disclosure, e.g., finding associations between a particular selection of training data, a particular training process for the machine-learning model, operation of a particular device suitable for use with the trained machine-learning model, operation of the machine-learning model in conjunction with particular data, modification of such particular data by the machine-learning model, etc., and/or other aspects that may be apparent to one of ordinary skill in the art based on this disclosure.

FIG. 1 depicts an exemplary environment 100 that may be utilized with techniques presented herein. One or more user device(s) 112 may communicate across an electronic network 110. As will be discussed in further detail below, one or more user guidance system(s) 102 may communicate with one or more of the other components of the environment 100, e.g., one or more user devices 112, across electronic network 110. The one or more user device(s) 112 may be associated with a user, e.g., a consumer, a user associated with the user device(s) 112, a user associated with the user guidance system 102, and/or a user associated with one or more of generating, training, or tuning a machine-learning model for determining a user base location and a user current location and/or providing a geo-targeted invitation As described, the one or more user device(s) 112 may be associated with one or more users, and may be configured to capture, by one or more processors of the user device(s) 112, electronic device location data. The one or more user device(s) 112 may also be configured to receive the user guidance and display and/or output the user guidance (e.g., by a user interface, a push notification, or the like).

In some embodiments, one or more of the components of the environment 100 are associated with a common entity, e.g., a financial institution, a merchant system, a user system, or the like. In some embodiments, one or more of the components of the environment may be associated with a different entity than another. In one example, user device 112 may be associated with a user (e.g., a consumer), while user guidance system 102 and a data store 116 may be associated with a guidance provider (e.g., a financial entity). In other embodiments, data store 116 may be associated with a third-party that provides data storage services to an entity associated with user guidance system 102. The systems and devices of the environment 100 may communicate in any arrangement. As will be discussed herein, systems and/or devices of the environment 100 may communicate in order to one or more of generate, train, or use a machine-learning model to identify location patterns, and/or output a user base location and user current location, among other activities.

The user device(s) 112 may be configured to enable a user to access and/or interact with other systems in the environment 100. For example, the user device(s) 112 may be a computer system such as, for example, a desktop computer, a mobile device, a tablet, etc. In some embodiments, the user device(s) 112 may include one or more electronic application(s), e.g., a program, interface, plugin, browser extension, mobile application, etc., installed on a memory of the user device(s) 112. In some embodiments, the electronic application(s) may be associated with one or more of the other components in the environment 100. For example, the electronic application(s) may include one or more of a mobile application, program, interface, browser extension, software module, etc., associated with user guidance system 102.

The user device(s) 112 may include a data capturing module 114. Data capturing module 114 may include a program, interface, plugin, browser extension, software module, or the like. Data capturing module 114 may capture, using one or more processors of the user device(s) 112, electronic device location data. The electronic device location data may indicate a general or specific geo-location of the user device(s) 112. In examples, data capturing module 114 may capture satellite data, carrier data, augmented reality data, or the like, that may indicate a location of the user device(s) 112. In examples, the location of the user device(s) 112 may likewise indicate the geo-location of a user associated with the user device(s) 112 (e.g., an individual's mobile phone that the user carries). In various embodiments, the electronic device location data may be captured by data capturing module 114 in a variety of ways, for example, by using internet protocol (IP) address information, by using global positioning (GPS) data (e.g., via satellite), by using beacons, carrier data and/or cellular towers, and the like. In still other examples, a location signal may be combined with a device identifier of the user device 112, which may allow the location of user device 112 to be tracked and/or recorded over time. In other examples, location data may be determined and/or captured by data capturing module 114 using points of interest (e.g., a store), landmarks, or augmented reality. In such examples, the location data may be captured using components of user device 112 such as a camera, one or more sensors, or the like. The location data may therefore represent geographical data associated with a unique user device 112. In examples, a time identifier may also be associated with the geographical data and may be included in the electronic device location data. As will be described in further detail below, user account data (e.g., transaction history, purchase history, and the like) may also be captured by data capturing module 114 or other components of environment 100. In examples, the user account data may be stored within a data store 116 and retrieved by data capturing module 114.

In various embodiments, the environment 100 may include a data store 116. The data store 116 may include a server system and/or a data storage system such as computer-readable memory such as a hard drive, flash drive, disk, etc. In some embodiments, the data store 116 includes and/or interacts with an application programming interface for exchanging data to other systems, e.g., one or more of the other components of the environment. In examples, data store 116 may store data or information of other components of the environment 100, such as the input and/or output of a machine-learning model, as described in more detail below, as well as the electronic device location data captured by data capturing module 114, the user account data, and the like. Data store 116 may also store log data related to user device(s) 112, data capturing module 114, and/or user guidance system(s) 102.

In various embodiments, the electronic network 110 may be a wide area network ("WAN"), a local area network ("LAN"), personal area network ("PAN"), or the like. In some embodiments, electronic network 110 includes the Internet, and information and data provided between various systems occurs online (e.g., via a web server). "Online" may refer to connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks-a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

As discussed in further detail below, the user guidance system(s) 102 may one or more of generate, store, train, or use a machine-learning model configured to find location patterns in location data and account data, and output a user base location and a user current location. The user guidance system(s) 102 may include a machine-learning model and/or instructions associated with the machine-learning model, e.g., instructions for generating a machine-learning model, training the machine-learning model, using the machine-learning model etc. The user guidance system(s) 102 may include instructions for retrieving, monitoring, and/or capturing location data and account data e.g., as input of the machine-learning model, and/or operating a display of the user device(s) 112 to provide output, e.g., as adjusted based on the machine-learning model. The user guidance system(s) 102 and/or data store 116 may include training data, e.g., location data and account data, and may include ground truth, e.g., training data, to identify location patterns in location data and account data and output a user current location and a user base location.

User guidance system(s) 102 may include machine-learning module 106. In various embodiments, machine-learning module 106 includes a machine-learning model configured to learn and identify location patterns in electronic device location data and account data to determine and output a user current location and a user base location. For example, the machine-learning model may learn to associate a particular location (e.g., of the location data) with a particular item of account data. In one particular example, if a unique user's purchase history reflects a purchase of groceries at regular intervals (e.g., account data) at Main Street Grocery Store (e.g., location data), then the machine-learning model may use that association between location data and account data to determine that the user's base location (e.g., home location) is near Main Street Grocery. In this way, the location patterns identified by the machine-learning model may reflect identified associations between location, time, transaction data, user behaviors, and the like. Therefore, the machine-learning model may be adaptable to each unique user. Each user, for example, may make different choices of when or where to purchase groceries for a variety of reasons. Still, the machine-learning model may be able to determine and output the user's base location with a level of accuracy.

Likewise, the machine-learning model may be configured to learn and identify location patterns in electronic device location data and account data to determine and output a user current location. In examples, the user current location may represent a different location than the user base location or it may represent the same location as the user base location. In an example, the user current location may represent a location of the user while the user is traveling away from a "home" (e.g., base) location. In one particular example, the user may live in Los Angeles, and the output user base location may be determined to be Los Angeles, or a geographic area within Los Angeles, while the output user current location may represent Alexandria, Virginia, or a geographic area within Alexandria, where the user is traveling for a time. In this way, guidance for the user may be geo-targeted by user guidance system(s) 102 based on the relationship between the user base location and the user current location. For example, an offer for groceries may be relevant to the user, and likewise to a grocery merchant, when the user is physically within, or within a proximity to, the user base location. However, an offer for a local restaurant may be more relevant to the user, and to the restaurant vendor, when the user is physically within, or within a proximity to, the user current location. Therefore, and in various embodiments, the machine-learning model may be configured to constantly, or at regular intervals, update the output user base location and user current location, based on updated location data and updated account data, as will be described in more detail below.

The machine-learning model may be trained using one or more gathered and/or simulated sets of location data and account data. For example, historical electronic device location data and account data may be used to train the machine-learning model. The machine-learning model may also be retrained using the location data, account data, and sets of the output user base locations and user current locations.

As depicted in FIG. 1, user guidance system(s) 102 may include guidance module 104. As described above, the machine-learning model may output a user base location and a user current location. These outputs may then be used to geo-target various guidance (e.g., offers, advertisements, marketing, coupons, incentives, invitations, or the like). In various embodiments, guidance module 104 may be configured to determine a user target location using the user current location and the user base location output by the machine-learning model. In this way, the user base location as related to the user current location may be utilized to determine the user target location. In examples, the user current location may be the same as the user base location, and the user target location may therefore represent that association between the user base location and the user current location. In other examples, the user current location may not be the same as the user base location, and the user target location may therefore represent that association. In still other examples, the user target location may reflect, or take into consideration, additional data such as a distance between the user base location and the user current location, patterns in the account data (e.g., purchasing behaviors), and the like. In any case, the user target location may represent a compilation of data, or the output resulting from an analysis of the same.

In various implementations, guidance module 104 may be configured to compare the user target location to entity target criteria to determine if the user target location satisfies the entity target criteria. The entity target criteria may include an entity target location and a location selection criteria. The user target location may therefore be used to geo-target guidance for the user as it is compared with an entity's (e.g., merchant's) set of targeting criteria. The merchant may select whether they desire to target a user within their base location and/or within their current (e.g., travelling) location. This selection may further determine if the guidance should be presented to the user.

As illustrated, user guidance system(s) 102 may also include transmission module 108. In various embodiments, transmission module 108 may be configured to transmit the user guidance to the electronic device associated with the unique user (e.g., to user device(s) 112) based on the user target location satisfying the entity target criteria. In examples, transmission module 108 may be configured to transmit a push notification to user device(s) 112. Transmission module 108 may also be configured to transmit the user guidance to machine-learning module 106, where the user guidance may be used as training data for the machine-learning model. Transmission module 108 may also provide the user guidance to data store 116 to be stored for retrieval by, user device(s) 112 and/or machine-learning module 106.

In some embodiments, a system or device other than the user guidance system(s) 102 is used to generate and/or train the machine-learning model. For example, such a system may include instructions for generating the machine-learning model, the training data and ground truth, and/or instructions for training the machine-learning model. A resulting trained-machine-learning model may then be provided to the user guidance system(s) 102.

Generally, a machine-learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., compare the output of the trained model with the ground truth for that portion of the training data to evaluate an accuracy of the trained model. The training of the machine-learning model may be configured to cause the machine-learning model to learn associations between electronic device location data and user account data, such that the trained machine-learning model is configured to identify location patterns and output a user base location and a user current location based on the learned associations. As used herein, the location patterns may include patterns found within locations a user frequents or travels to, purchasing history of a user, purchasing behaviors of a user, geographic movement behaviors of a user, and the like.

In various embodiments, the variables of a machine-learning model may be interrelated in any suitable arrangement in order to generate the output. For example, in some embodiments, the machine-learning model may include content-processing architecture that is configured to identify, isolate, and/or extract features, geometry, and or structure in one or more of optical character recognition data and/or non-optical in vivo image data. For example, the machine-learning model may include one or more convolutional neural network ("CNN") configured to identify patterns in electronic device location data and user account data, and may include further architecture, e.g., a connected layer, neural network, etc., configured to determine a relationship between the identified patterns in order to output a user base location and a user current location.

In some instances, different samples of training data and/or input data may not be independent. For example, samples of training data may include location data and account data captured from users that elect to be monitored and/or to provide such data for the gathering of such training data, simulated location data and account data, simulated or historical user base locations and/or user current locations, and the like. Thus, in some embodiments, the machine-learning model may be configured to account for and/or determine relationships between multiple samples, at times from multiple sources.

For example, in some embodiments, the machine-learning model of the user guidance system 102 may include a Recurrent Neural Network ("RNN"). Generally, RNNs are a class of feed-forward neural networks that may be well adapted to processing a sequence of inputs. In some embodiments, the machine-learning model may include a Long Short Term Memory ("LSTM") model and/or Sequence to Sequence ("Seq2Seq") model. An LSTM model may be configured to generate an output from a sample that takes at least some previous samples and/or outputs into account. A Seq2Seq model may be configured to, for example, receive a sequence of electronic device location data and user account data as input, and generate a user base location and a user current location as output.

Although depicted as separate components in FIG. 1, it should be understood that a component or portion of a component in the environment 100 may, in some embodiments, be integrated with or incorporated into one or more other components. For example, a display may be integrated into the user device 112 or the like. In another example, the user guidance system 102 may be integrated in a data storage system. The data storage system may be configured to communicate and/or receive/send data across electronic network 110 to other components of environment 100. Further, user guidance system 102 may be integrated or incorporated into a software module of user device(s) 112. In some embodiments, operations or aspects of one or more of the components discussed above may be distributed amongst one or more other components. Any suitable arrangement and/or integration of the various systems and devices of the environment 100 may be used.

Further aspects of the machine-learning model and/or how it may be utilized are discussed in further detail in the methods below. In the following methods, various acts may be described as performed or executed by a component from FIG. 1, such as user guidance system 102, the user device 112, or components thereof. However, it should be understood that in various embodiments, various components of the environment 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

FIG. 2 illustrates an exemplary method 200 of transmitting user guidance, such as in the various examples discussed herein. At step 205, electronic device location data may be captured. The electronic device location data may pinpoint or indicate a physical geographic location or general area of the electronic device at a given time or over a time interval. The electronic device location data may be captured using an electronic device associated with a unique user (e.g., such as user device(s) 112, as depicted in FIG. 1). Components of the electronic device, such as global positioning software, satellite or cell tower receivers, and the like, may be used to capture the electronic device location data. In examples, these components may be implemented as a data capturing module (e.g., such as data capturing module 114, as depicted in FIG. 1). In various implementations, the electronic device location data may record, monitor, or otherwise capture the physical location or movements of the electronic device. In this way, the given location of a user of the electronic device may also be captured.

At step 210, the electronic device location data and a plurality of account data of the unique user may be provided to a machine-learning model (e.g., implemented by machine-learning module 106, as depicted in FIG. 1). In examples, the account data may be a history of purchases made by the user (e.g., a transaction history). In some respects, the account data may include items purchased, locations where the item was purchased (e.g., a merchant and/or a geographic location), the amount of the purchase, and the like. However, the account data may also include, or give insight into, a user's purchasing behaviors, such as frequency of certain purchases, brands purchased, merchants visited, user preferences, user habits, or the like.

The machine-learning model may have been trained to identify location patterns using the electronic device location data and the account data. In this way, associations between data related to a user's purchasing behaviors and the user's location may be identified and learned by the machine-learning model. Further, the machine-learning model may have been trained to output a user current location and a user base location based upon the identified associations (e.g., location patterns). In various implementations, and as described above, the user current location may be the same as, or different from, the user base location. The user current location may indicate a current geo-location of the user and the user base location may indicate a "home" location for the user. Therefore, the user base location may indicate the user's home (e.g., place of residence), or may represent a geo-location where the user spends a significant amount of time (e.g., a work location, a larger geographic area surrounding the user's home, or the like). In some examples, the user may be able to select between more than one user base location that may be output by the machine-learning model (e.g., selecting a "work" location versus a "home" location). In other examples, the user may be able to toggle between more than one user base location (as output by the machine-learning model) in order to filter the user guidance. In one particular example, the user may wish to set the user base location to a "work" location in order to direct the user guidance system to output user guidance that is relevant to the user at that geo-location for a period of time.

The following describes a simplified example of the machine-learning input and output to illustrate a significance of the determination of the user base location versus the user current location, among other things. In the example, the machine-learning model may take as input the electronic device location data and the user account data. For this example, the data are described in plain language; however, the data may be captured or converted in any format that may allow the machine-learning model to receive it as input (e.g., raw data, parsed data, or the like). Accordingly, the machine-learning model may receive electronic device location data: Phoenix at 4:00 AM on Thursday, Tempe at 6:00 PM on Thursday, and Tucson at 10:00 AM on Saturday. The machine-learning model may also receive, as input, user account data: no purchases in Phoenix at 4:00 AM on Thursday, a grocery store purchase in the amount of $235.16 in Tempe at 6:00 PM on Thursday, and a restaurant purchase in the amount of $52.38 in Tucson at 10:00 AM on Saturday. In this example, the machine-learning model may take the above as input and identify location patterns by finding associations within the data. For example, Phoenix may be determined to be a user base location because, among other things, the user made no purchases at a time when it may be customary for the user to be asleep at home. Further, the larger geographic area of the Phoenix Metro Area may be determined to be the user base location because of the proximity of Tempe (where the user purchased groceries) to Phoenix (the user's home). Alternatively, Tempe may be determined to be the user current location in examples where the user infrequently purchases groceries in that city.

In other words, the machine-learning model may find associations and location patterns within large amounts of data over time to determine, for example, how frequently the user purchases groceries in Tempe around the time of 6:00 PM (e.g., weekly, every once in a while, almost never, or the like) in order to determine whether Tempe should be included in the user base location or, alternatively, output as a user current location. This distinction is important, as this determination may affect the user guidance. For example, if Tempe is a location that the user frequents to purchase groceries before going home, the user guidance system may utilize such data in the determination of the relevance of an offer for take-out food (e.g., for dinner) when the user is in Tempe at a time when the user may be considering food options (e.g., purchasing groceries). Likewise, if Tempe is determined to be a user current location (e.g., not an area that the user visits with routine frequency), then the user guidance system may likewise utilize such data in the determination of the relevance of an offer for gasoline (e.g., for a user that is travelling through the city on the way home), or another item that represents or corresponds to the user's purchase history (e.g., account data) in that area and/or time. Tucson, therefore, may also be determined to be a user current location because, in this example, the user makes a restaurant purchase in the area instead of a grocery purchase, which indicates behaviors that may be more customary for the user while travelling to an area, versus living within the area. In various implementations, the user base location and user current location that are output may be updated constantly or near constantly based on new input into the machine-learning model, or may be updated based on the input at predetermined intervals of time. In examples, associations and location patterns may be determined by the machine-learning model based only on new input into the machine-learning model at any given time, or associations and location patterns may be determined based on new and previous input, or based on prior output of the machine-learning model (e.g. retraining).

In various implementations, the user base location and user current location may be utilized by the user guidance system (e.g., such as user guidance system 102, as depicted in FIG. 1) to provide geo-targeted guidance for a particular, unique user. At step 215, a user target location is determined using the user current location and the user base location (e.g., using guidance module 104, as depicted in FIG. 1). In examples, the user target location may represent a relationship between the user base location and the user current location. As such, the user target location may give context to the patterns identified by the machine-learning model that may be utilized by the user guidance system to determine the user guidance. In examples, for each output user base location and user current location, there may be more than one user target location that is determined by the user guidance system, and the user target location may depend upon time and location. According to the simplified example above, the user target location at 6:00 PM on Thursdays may be Tempe, a guidance module (such as guidance module 104, as depicted in FIG. 1) having determined the user target location using the user base location and user current location.

At step 220, the user target location may be compared to entity target criteria (e.g., using guidance module 104, as depicted in FIG. 1). The entity target criteria may include an entity target location. In various implementations, the entity target location may be chosen by an entity (e.g., a merchant) based upon a strategy (e.g., a marketing strategy). For example, a restaurant in Tucson, located near the interstate roadway, may wish to target consumers that are travelling along that interstate roadway. Because the entity target location is compared with the user target location, the entity may be enabled to geographically target potential consumers. Further, because the user target location is determined using the user base location and the user current location, which represent an analysis and identification of user behavioral patterns, such as geographical movement and purchasing habits, the entity may be enabled to more effectively target potential consumers that may yield an even greater chance of consumer engagement with the targeted user guidance.

The entity target location may also include a location selection criteria. The location selection criteria may include a selection of one of the user current location, the user base location, or both the user current location and the user base location. In various implementations, an entity may wish to target particular consumers based on the user base location, or based on the user current location at any given time. The disclosed embodiments enable adaption of the user guidance to a variety of scenarios. According to the above-described example, a Tucson restaurant (e.g., an entity) may wish to offer consumers a discount based on being a resident of Tucson. Therefore, the location selection criteria for this particular marketing campaign for this particular restaurant may include a selection of the user base location being Tucson. Likewise, the Tucson restaurant may wish to select both the user base location and the user current location in a marketing campaign that offers a discount for any patron, in order to target any consumer in the area, regardless of residency. Further, the plurality of account data may be filtered based on the entity target criteria. In examples, the entity target criteria may reflect a wish of the entity to target particular consumers based on purchasing behaviors. In one particular example, if a unique user rarely eats at restaurants, then an entity such as a restaurant may not wish to push an offer to that user. Therefore, filtering based on the entity target criteria enables the entity to more precisely target potential consumers using the user guidance system.

In any scenario, comparing the user target location to the entity target criteria may determine if the user target location satisfies the entity target criteria. The entity target criteria may also include a target account type (e.g., bank account, credit card of a particular card issuer, credit card associated with a particular program, such as awards or status, and the like). The plurality of account data may also be compared to the target account type to determine if the plurality of account data satisfies the target account type. If the user target location does not satisfy the entity target criteria, then, at step 225, exemplary method 200 ends. In an example, if the user target location does not satisfy the entity target criteria, then the user guidance is not transmitted to the electronic device (e.g., pushed to the user), because, for example, receiving engagement from the user with an invitation may not be likely, it may allow for a more efficient use of available resources of an entity, or the like. Finally, If the user target location does satisfy the entity target criteria, then, at step 230, the user guidance may be transmitted to the electronic device associated with the unique user (e.g., user device(s) 112, as depicted in FIG. 1, using transmission module 108) based on the user target location satisfying the entity target criteria. In examples, transmitting the user guidance if the user target location satisfies the entity target criteria may prevent an oversaturation of invitations that may be unlikely to be used or engaged with, while maintaining the available resources of an entity for those circumstances that are more likely to result in engagement from the user. Additionally, the user guidance may be more relevant to the unique user if the user target location satisfies the entity target criteria.

Figure 3:
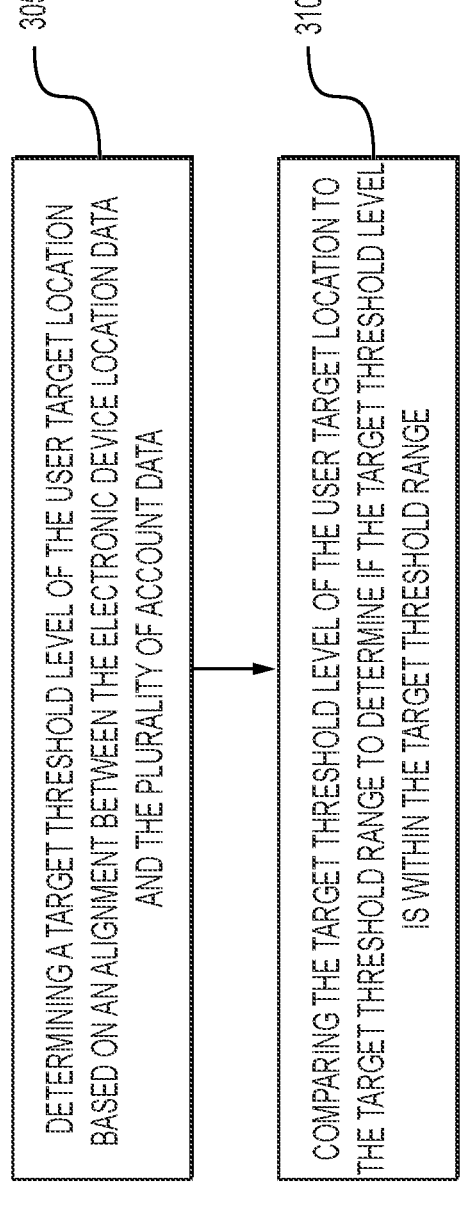
FIG. 3 depicts a flowchart of an exemplary method of determining a target threshold level of a user target location, according to one or more embodiments.

FIG. 3 illustrates an exemplary method 300 of determining a target threshold level of a user target location, such as in the various examples discussed herein. In various embodiments, the entity target criteria (e.g., as described with respect to FIG. 2) may include a target threshold range. At step 305, a target threshold level of the user target location is determined based on an alignment between the electronic device location data and the plurality of account data. In examples, an accuracy of the electronic device location data may be checked against the plurality of account data and visa versa. At step 310, the target threshold level of the user target location is compared to the target threshold range. The comparing may determine if the target threshold level is within the target threshold range.

FIG. 4 illustrates an exemplary method of transmitting user guidance using a user future location, such as in the various examples discussed herein. At step 405, electronic device location data may be captured. The electronic device location data may be captured using an electronic device associated with a unique user (e.g., such as user device(s) 112, as depicted in FIG. 1). At step 410, the electronic device location data and a plurality of account data of the unique user may be provided to a machine-learning model (e.g., of machine-learning module 106, as depicted in FIG. 1). The machine-learning model may have been trained to identify location patterns. Further, the machine-learning model may have been trained to output a user future location. In examples, the user future location may represent a prediction of where the user may be located, or a prediction of a future purchase by the user, based upon the input data. According to the example above, as described with respect to FIG. 2, if a user generally purchases groceries in Tempe at 6:00 PM on Thursdays, then the user future location may be utilized to predict that the user may be at that same location, making a similar purchase, at a similar time.

At step 415, a user target location is determined using the user future location (e.g., using guidance module 104, as depicted in FIG. 1). At step 420, the user target location may be compared to entity target criteria (e.g., using guidance module 104, as depicted in FIG. 1). The entity target criteria may include an entity target location and a location selection criteria. The location selection criteria may include a selection of one of the user future location or a user current location. The plurality of account data may be filtered based on the entity target criteria. Comparing the user target location to the entity target criteria may determine if the user target location satisfies the entity target criteria. The entity target criteria may also include a target account type. The plurality of account data may also be compared to the target account type to determine if the plurality of account data satisfies the target account type. If the user target location does not satisfy the entity target criteria, then, at step 425, exemplary method 400 ends. As described above, if the user target location does not satisfy the entity target criteria, then guidance is not pushed to the user. If the user target location does satisfy the entity target criteria, then, at step 430, the user guidance may be transmitted to the electronic device associated with the unique user (e.g., user device(s) 112, as depicted in FIG. 1, using transmission module 108) based on the user target location satisfying the entity target criteria. According to the example described above, the user guidance system may transmit guidance, such as a coupon for groceries, to the user based upon a prediction that the user will purchase groceries at a certain time, and at a certain location, using the location patterns identified by the machine-learning model. In examples, transmitting the user guidance if the user target location satisfies the entity target criteria may prevent an oversaturation of invitations that may be unlikely to be used or engaged with, while maintaining the available resources of an entity for those circumstances that are more likely to result in engagement from the user based upon a predicted future location of the user. Additionally, the user guidance may be more relevant to the unique user if the user target location satisfies the entity target criteria.

Figure 5:
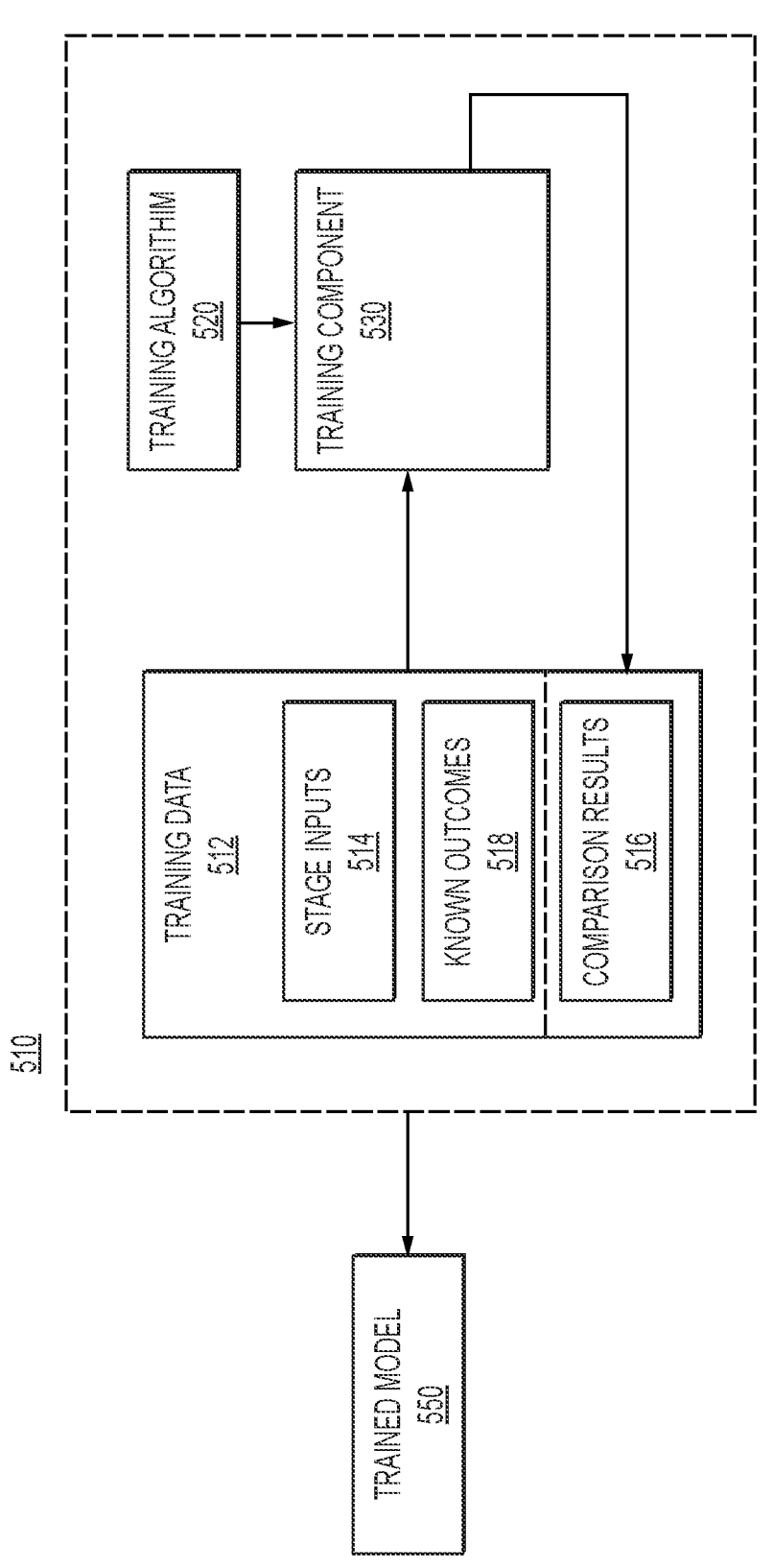
FIG. 5 depicts a flow diagram for training a machine-learning model, according to one or more embodiments.

As disclosed herein, one or more implementations disclosed herein may be applied by using a machine-learning model. A machine-learning model as disclosed herein may be trained using one or more components or steps of FIGS. 1-4. As shown in flow diagram 510 of FIG. 5, training data 512 may include one or more of stage inputs 514 and known outcomes 518 related to a machine-learning model to be trained. The stage inputs 514 may be from any applicable source including a component or set shown in the figures provided herein. The known outcomes 518 may be included for machine-learning models generated based on supervised or semi-supervised training. An unsupervised machine-learning model might not be trained using known outcomes 518. Known outcomes 518 may include known or desired outputs for future inputs similar to or in the same category as stage inputs 514 that do not have corresponding known outputs.

The training data 512 and a training algorithm 520 may be provided to a training component 530 that may apply the training data 512 to the training algorithm 520 to generate a trained machine-learning model 550. According to an implementation, the training component 530 may be provided comparison results 516 that compare a previous output of the corresponding machine-learning model to apply the previous result to re-train the machine-learning model. The comparison results 516 may be used by the training component 530 to update the corresponding machine-learning model. The training algorithm 520 may utilize machine-learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like. The output of the flow diagram 510 may be a trained machine-learning model 550.

A machine-learning model disclosed herein may be trained by adjusting one or more weights, layers, and/or biases during a training phase. During the training phase, historical or simulated data may be provided as inputs to the model. The model may adjust one or more of its weights, layers, and/or biases based on such historical or simulated information. The adjusted weights, layers, and/or biases may be configured in a production version of the machine-learning model (e.g., a trained model) based on the training. Once trained, the machine-learning model may output machine-learning model outputs in accordance with the subject matter disclosed herein. According to an implementation, one or more machine-learning models disclosed herein may continuously update based on feedback associated with use or implementation of the machine-learning model outputs.

It should be understood that embodiments in this disclosure are exemplary only, and that other embodiments may include various combinations of features from other embodiments, as well as additional or fewer features. For example, while some of the embodiments above pertain to multipartite relay, any suitable activity may be used.

In general, any process or operation discussed in this disclosure that is understood to be computer-implementable, such as the processes illustrated in the flowcharts disclosed herein, may be performed by one or more processors of a computer system, such as any of the systems or devices in the exemplary environments disclosed herein, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices disclosed herein. One or more processors of a computer system may be included in a single computing device or distributed among a plurality of computing devices. A memory of the computer system may include the respective memory of each computing device of the plurality of computing devices.

Figure 6:
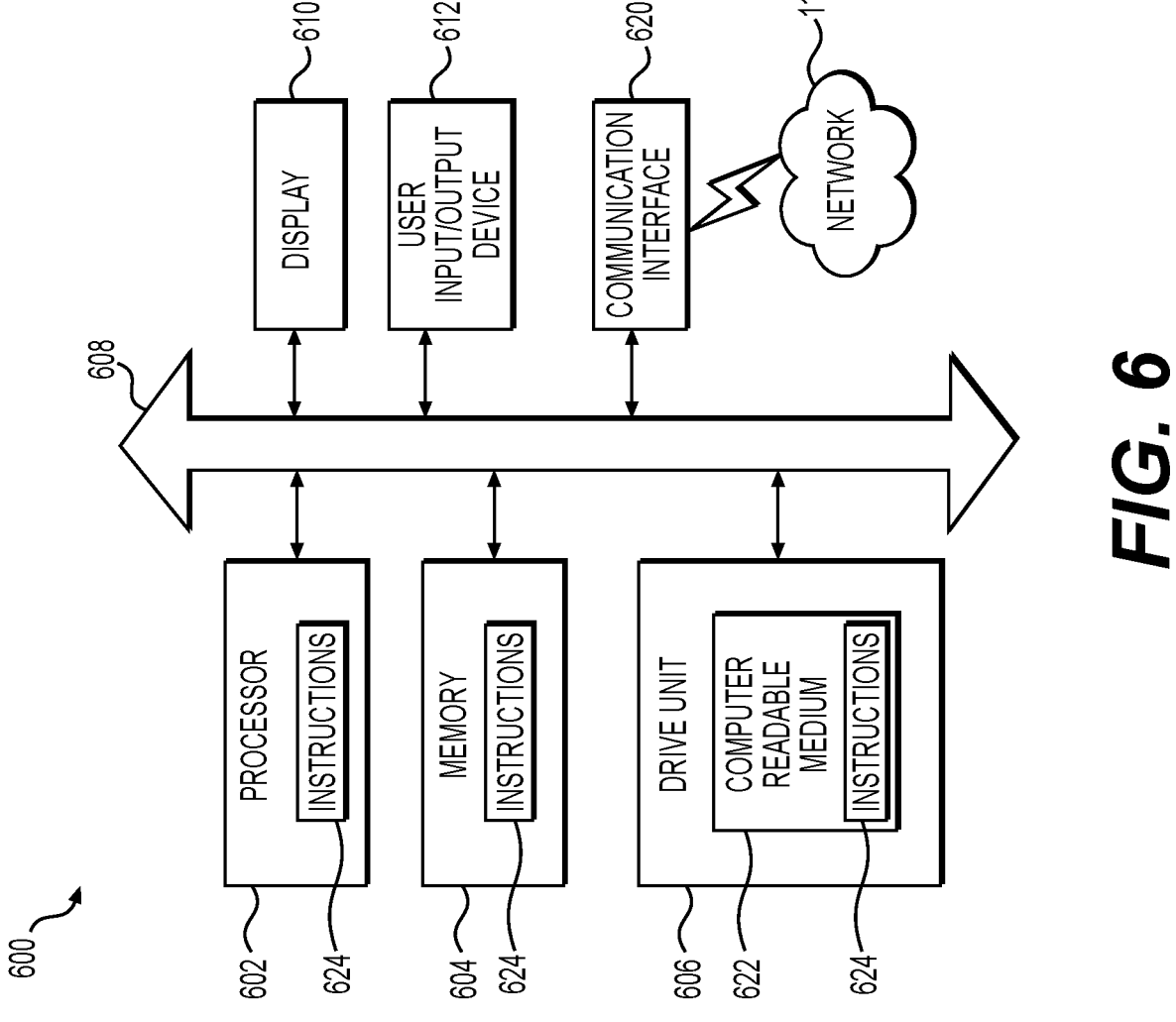
FIG. 6 depicts an example of a computing device, according to one or more embodiments.

FIG. 6 is a simplified functional block diagram of a computer 600 that may be configured as a device for executing the methods disclosed here, according to exemplary embodiments of the present disclosure. For example, the computer 600 may be configured as a system according to exemplary embodiments of this disclosure. In various embodiments, any of the systems herein may be a computer 600 including, for example, a data communication interface 620 for packet data communication. The computer 600 also may include a central processing unit ("CPU") 602, in the form of one or more processors, for executing program instructions. The computer 600 may include an internal communication bus 608, and a storage unit 606 (such as ROM, HDD, SDD, etc.) that may store data on a computer readable medium 622, although the computer 600 may receive programming and data via network communications. The computer 600 may also have a memory 604 (such as RAM) storing instructions 624 for executing techniques presented herein, although the instructions 624 may be stored temporarily or permanently within other modules of computer 600 (e.g., processor 602 and/or computer readable medium 622). The computer 600 also may include input and output ports 612 and/or a display 610 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method of transmitting user guidance, the method comprising:
   receiving, by one or more processors, captured electronic device location data, the captured electronic device location data having been captured using an electronic device associated with a unique user;
   providing, by the one or more processors, the electronic device location data and a plurality of account data of the unique user to a machine-learning model, wherein the machine-learning model has been trained, using one or more gathered and/or simulated sets of location data and one or more gathered and/or simulated sets of account data, to identify location patterns within the electronic device location data and the plurality of account data of the unique user and output a user current location and a user base location;
   determining, by the one or more processors, a user target location using the user current location and the user base location;
   comparing, by the one or more processors, the user target location to entity target criteria, the entity target criteria comprising an entity target location and a location selection criteria to determine if the user target location satisfies the entity target criteria; and
   transmitting, by the one or more processors, the user guidance to the electronic device associated with the unique user based on the user target location satisfying the entity target criteria.

2. The computer-implemented method of claim 1, wherein the location selection criteria comprises a selection of one of the user current location, the user base location, or both the user current location and the user base location.

3. The computer-implemented method of claim 1, wherein the plurality of account data is filtered based on the entity target criteria.

4. The computer-implemented method of claim 1, wherein the entity target criteria further comprises a target threshold range.

5. The computer-implemented method of claim 4, further comprising:
   determining, by the one or more processors, a target threshold level of the user target location based on an alignment between the electronic device location data and the plurality of account data; and
   comparing, by the one or more processors, the target threshold level of the user target location to the target threshold range to determine if the target threshold level is within the target threshold range.

6. The computer-implemented method of claim 1, wherein the entity target criteria further comprises a target account type.

7. The computer-implemented method of claim 6, further comprising:
   comparing, by the one or more processors, the plurality of account data to the target account type to determine if the plurality of account data satisfies the target account type.

8. The computer-implemented method of claim 1, further comprising:
   outputting, by the machine-learning model, a user future location using the identified location patterns within the electronic device location data and the plurality of account data of the unique user.

9. A computer-implemented method of transmitting user guidance, the method comprising:

receiving, by one or more processors, captured electronic device location data, the captured electronic device location data having been captured using an electronic device associated with a unique user;

providing, by the one or more processors, the electronic device location data and a plurality of account data of the unique user to a machine-learning model, wherein the machine-learning model has been trained, using one or more gathered and/or simulated sets of location data and one or more gathered and/or simulated sets of account data, to identify location patterns within the electronic device location data and the plurality of account data of the unique user and output a user future location;

determining, by the one or more processors, a user target location using the user future location;

comparing, by the one or more processors, the user target location to entity target criteria, the entity target criteria comprising an entity target location and a location selection criteria to determine if the user target location satisfies the entity target criteria; and transmitting, by the one or more processors, the user guidance to the electronic device associated with the unique user based on the user target location satisfying the entity target criteria.

10. The computer-implemented method of claim 9, further comprising:

outputting, by the machine-learning model, a user current location using the identified location patterns within the electronic device location data and the plurality of account data of the unique user.

11. The computer-implemented method of claim 10, wherein the location selection criteria comprises a selection of one of the user future location or a user current location.

12. The computer-implemented method of claim 9, wherein the plurality of account data is filtered based on the entity target criteria.

13. The computer-implemented method of claim 9, wherein the entity target criteria further comprises a target threshold range.

14. The computer-implemented method of claim 13, further comprising:

determining, by the one or more processors, a target threshold level of the user target location based on an alignment between the electronic device location data and the plurality of account data; and comparing, by the one or more processors, the target threshold level of the user target location to the target threshold range to determine if the target threshold level is within the target threshold range.

15. The computer-implemented method of claim 9, wherein the entity target criteria further comprises a target account type.

16. The computer-implemented method of claim 15, further comprising:

comparing, by the one or more processors, the plurality of account data to the target account type to determine if the plurality of account data satisfies the target account type.

17. A system for transmitting user guidance, the system comprising:

a memory storing instructions and a machine-learning model trained to find patterns between one or more gathered and/or simulated sets of location data and one or more gathered and/or simulated sets of account data to identify location patterns and output a user current location and a user base location; and one or more processors operatively connected to the memory and configured to execute the instructions to perform operations including:

receiving captured electronic device location data of a unique user;

providing the electronic device location data and a plurality of account data of the unique user to the machine-learning model;

outputting, by the machine-learning model, the user current location and the user base location;

determining a user target location using the user current location and the user base location;

comparing the user target location to entity target criteria, the entity target criteria comprising an entity target location and a location selection criteria to determine if the user target location satisfies the entity target criteria; and transmitting the user guidance to the electronic device associated with the unique user based on the user target location satisfying the entity target criteria.

18. The system of claim 17, wherein the location selection criteria comprises a selection of one of the user current location, the user base location, or both the user current location and the user base location.

19. The system of claim 17, wherein the plurality of account data is filtered based on the entity target criteria.

20. The system of claim 17, wherein the entity target criteria further comprises a target account type.

* * * * *